Patented June 11, 1940

2,204,459

UNITED STATES PATENT OFFICE 2,204,459

TREATMENT OF LIVER

Verl A. Wise, Stanley B. Duffies, Grover R. Henney, and Carl L. Lohner, Chicago, Ill., assignors to Industrial Patents Corporation, Chicago, Ill., a corporation of Delaware No Drawing. Application June 3, 1939, Serial No. 277,260

2 Claims. (Cl. 99—169)

This invention relates to an improved method for treating liver.

For purposes of preservation during long periods of storage and shipment, large quantities of livers, such as beef livers, are frozen. Various methods have been employed from time to time for freezing livers, but great difficulty has been experienced in producing a frozen liver with a bright fresh appearance which maintains that appearance upon defrosting.

The present invention provides a method whereby frozen livers may be produced which present a bright fresh appearance definitely superior in color and salability to livers frozen by methods heretofore known.

In carrying out the present invention in a slaughter house, hot beef livers immersed in their own blood are delivered at frequent intervals in tight trucks from the killing floor to the sharp freezers. The bottom surface of each liver is wiped to remove excess blood, after which it is placed in a frame or form which has been coated with oleo oil on the inside surface.

The preferred material for making the pan or frame is aluminum because of its high conductivity. The pan may have compartments, each of suitable size for a single liver. The liver contacts the pan at the sides and bottom, the top of the liver being exposed. After the liver has been placed in the pan, the top or exposed surface of the liver is carefully wiped with a piece of cheese cloth which has been blood soaked and wrung to remove excess blood from the top surface of the liver and to prevent a streaky condition. Leaving a uniform film of blood on the surface of the liver gives a polished appearance after freezing.

We have found that this procedure followed by permitting the liver to freeze assures a greatly improved frozen liver. When subjected to sharp freezer conditions, usually at temperatures below zero degrees Fahrenheit, the livers freeze satisfactorily in twenty to twenty-four hours, after which they are removed from the pans and packed in boxes lined with wax paper. The livers may be kept frozen indefinitely after packing in wax paper lined boxes, the wax paper being effective to prevent dehydration.

We claim:

1. The method of treating livers which comprises removing excess blood from fresh livers, placing the livers in forms, wiping the exposed surface of the livers to assure a uniform thin film of blood coating the exposed surface of the livers and freezing the livers.

2. In the preparation of liver for freezing, the step of wiping the surface of the liver with a blood moistened cloth to provide a uniform thin film of blood coating the surface of the liver.

VERL A. WISE.
STANLEY B. DUFFIES.
GROVER R. HENNEY.
CARL L. LOHNER.